3,346,511
CATALYST, PREPARATION THEREOF, AND POLYMERIZATION PROCESS USING SAID CATALYST

Thomas Hill, Falkirk, Scotland, assignor, by mesne assignments, to British Hydrocarbon Chemicals Limited, London, England, a British company
No Drawing. Filed July 23, 1963, Ser. No. 296,919
Claims priority, application Great Britain, Aug. 16, 1962, 13,511/62
5 Claims. (Cl. 252—455)

The present invention relates to the preparation of catalytic compositions and use thereof for the polymerization of olefins.

The use of compositions containing chromic oxide as catalysts for the polymerization of olefins and especially for the polymerization of ethylene is well known. Such catalytic compositions have hitherto been prepared by impregnation of carrier materials such as silica or silica/alumina with aqueous solutions of chromic acid, drying of the product, and subsequently activating by heating in a stream of air or oxygen.

After polymerization the catalyst is either removed from or allowed to remain in the final polymer product. The presence of residual traces of catalyst has however been found to result in harmful effects on the polymer properties, the chromium content of the catalyst being largely responsible for the deterioration.

It is an object of the present invention to provide an improved catalyst.

Another object of the invention is to provide an improved process for producing a catalyst.

Still another object is to provide a process for polymerizing olefins.

A further object of the invention is to provide catalysts giving a highly efficient utilization of their chromium content.

A still further object of the invention is to provide a catalyst, the use of which results in a high polymerization rate per unit of chromium present.

Other and further objects and advantages of the invention will become apparent to those skilled in the art upon consideration of the accompanying disclosure.

According to the present invention, the process for preparing a polymerization catalyst comprises impregnating a carrier material with the vapor of chromyl chloride and subsequently heating the impregnated carrier material in the presence of molecular oxygen to activate the catalyst.

The carrier material may be any suitable material useful as a carrier for polymerization catalysts. Suitable examples include silica, silica gel, silica/alumina, or alumina, preferably those materials having a surface area in the range 200–700 square meters/gm. Materials having surface areas outside this range can also be used. It is preferred to dry and pre-treat the carrier material before impregnation with chromyl halide, for example, by heating in air at temperatures between 300 and 1000° C., preferably between 500 and 700° C. An advantage of the catalyst compositions according to the present invention is that the carrier material may be dried or activated by heat treatment before impregnation, and the use of a high activation temperature, such as is normally required to dehydrate the catalyst after impregnation with an aqueous solution of a chromium compound, is not then essential to produce an active catalyst. Thus pretreatment of the carrier material, by heating or other means, can be carried out without the necessity of exposing the chromium content of the catalyst to the conditions of the pre-treatment, and the carrier does not have to be exposed to the action of water subsequent to its pre-treatment, as would be required if the conventional aqueous impregnation technique were used.

The carrier material is impregnated with chromyl chloride by passing chromyl chloride in the vapor phase through a suitable quantity of carrier material. Preferably, the chromyl chloride vapor is in admixture with a carrier gas such as air. The carrier gas flow rate may vary within moderately wide limits, but should preferably be sufficient to fluidize the inert carrier material. The impregnation is suitably carried out at a temperature above the boiling point of chromyl chloride, and preferably within the range 120 to 250° C. Lower temperatures may be used, provided the chromyl chloride remains in the vapor phase, and higher temperatures are not disadvantageous provided that they are not high enough to bring about significant premature decomposition of the chromyl chloride. The impregnation can be continued until no more chromyl chloride is adsorbed, or it may be stopped, if desired, before this condition is reached. By using this method of preparation, catalysts may be obtained having chromium contents in the range from about 0.05 to about 10 percent by weight based on the total weight of the catalyst. It is preferred to limit the chromium content of the catalyst to the range 0.1 to 7 percent by weight.

After impregnation, the catalyst is activated by heating it in a stream of gas containing molecular oxygen at a temperature which is preferably within the range 300–1000° C., and for a period in the range of 0.5 to 10 hours. A heating period of about 2 hours is often preferred. It has been found that where the carrier material is pre-treated at a moderate temperature, e.g., below about 500° C., it is only necessary to subject it to a short heat treatment after impregnation, also at a moderate temperature. Alternatively, where the carrier material is pre-treated at a higher temperature, e.g., 600 to 900° C., a subsequent heat treatment in dry air at about 600 to 1000° C. is necessary to obtain a highly active catalyst. The activation can be carried out, for example, in the same vessel as that used for impregnation, or the catalyst may be transferred to another vessel. In either case, a stream of the gas containing molecular oxygen is passed through the impregnated material at the required temperature. A suitable oxygen-containing gas is air.

A more comprehensive understanding of the invention can be obtained by referring to the following illustrative example, which is not intended, however, to be unduly limitative of the invention.

Example

A Davison High Pore Volume silica/alumina microspheroidal base material was dried in a stream of dry air at 350° C. The dried base material was then transferred to a 2" diameter glass tube and maintained in a fluidized state by a stream of dry air at a temperature of 150° C. A bleed stream of the dry air was passed through hot liquid chromyl chloride, and this bleed stream containing chromyl chloride was recombined with the main air stream and passed through the fluidized bed of catalyst base. After about 60 minutes chromyl chloride vapor was detected in the exit air stream leaving the catalyst, and chromyl chloride addition was stopped. The impregnated material was divided into four samples, each of which was activated in a stream of dried air at a different temperature.

These catalyst samples were tested for polymerization activity in a stirred batch reactor using the following conditions in each run.

Solvent: High purity dry cyclohexane (300 parts).
Monomer feed: Dry ethylene containing 4–5 percent propylene, free of oxygen and acetylenic impurities.

Catalyst charge: Approximately 0.1 part.
Reaction pressure: 450 p.s.i.g.
Reaction temperature: 120–130° C.

The polymerization rates obtained were as shown in the following table at various temperatures of air treatment after impregnation with chromyl chloride.

TABLE

| Run No. | Temperature of air activation after impregnation, ° C. | Mean Polymerization Temperature, ° C. | Polymerization Rate, gm./gm. catalyst/hr. |
| --- | --- | --- | --- |
| 1 | 440 | 123 | 214 |
| 2 | 600 | 128 | 346 |
| 3 | 700 | 126 | 517 |
| 4 | 800 | 128 | 375 |

The data in the above table demonstrate the high polymeridation rates obtained with the catalyst of this invention. When the runs are repeated using catalysts prepared with other types of carrier material, including silica and alumina supports, similar results are obtained.

Ethylene-propylene copolymers were prepared in the above-described polymerizations. The catalyst of this invention is effective in preparing homopolymers as well as copolymers of α-olefins, e.g., ethylene, propylene, butene-1, pentene-1, and the like. In general, the catalyst can be used to polymerize aliphatic 1-olefins having 2 to 8 carbon atoms as disclosed in U.S. Patent No. 2,825,721 (1958). The polymerizations are usually conducted at a temperature in the range of 100 to 500° F., preferably from 150 to 375° F. For other details applicable to the polymerization process, reference may be had to Patent No. 2,825,721.

As will be evident to those skilled in the art, many variations and modifications can be practiced in view of the foregoing disclosure. Such variations and modifications are believed to come within the spirit and scope of the invention.

I claim:
1. A process of preparing a polymerization catalyst which comprises impregnating a carrier material with vapor of chromyl chloride; and subsequently heating said impregnated carrier material in the presence of molecular oxygen at a temperature of from about 300 to about 1000° C.
2. Process of claim 1 wherein said carrier is selected from the group consisting of silica, silica gel, silica/alumina and alumina.
3. Process of claim 1 wherein said carrier is heated in air at a temperature in the range of from about 300 to about 1000° C. prior to impregnation of said carrier with said chromyl chloride.
4. The process according to claim 3 in which said carrier material is heated in air at a temperature in the range of 500 to 700° C. before impregnation with chromyl chloride vapor.
5. A process of preparing a polymerization catalyst which comprises heating in air at a temperature in the range of 300 to 1000° C. a carrier material selected from the group consisting of silica, silica gel, silica/alumina and alumina; impregnating said carrier material with vapor of chromyl chloride; heating said impregnated carrier material in the presence of molecular oxygen at a temperature of from about 300 to about 1000° C.

References Cited

UNITED STATES PATENTS

| | | | |
| --- | --- | --- | --- |
| 2,825,721 | 3/1958 | Hogan et al. | 260—94.9 |
| 3,172,882 | 3/1965 | D. Witt | 260—94.9 |
| 3,207,699 | 9/1965 | William Harding et al. | 117—106 |

OTHER REFERENCES

Chem. Abs. 48: 6305F (1954).

JOSEPH L. SCHOFER, *Primary Examiner.*

L. EDELMAN, *Assistant Examiner.*